(12) United States Patent
Rautiainen et al.

(10) Patent No.: US 7,292,584 B1
(45) Date of Patent: Nov. 6, 2007

(54) EFFECTIVE MULTILINK FLOW HANDLING

(75) Inventors: Jaakko Rautiainen, Oulu (FI); Petri Saarela, Tupos (FI); Pentti Toivanen, Martinniemi (FI); Arto Maatta, Oulu (FI); Pekka Multanen, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/168,913

(22) PCT Filed: Dec. 30, 1999

(86) PCT No.: PCT/EP99/10475

§ 371 (c)(1),
(2), (4) Date: Aug. 29, 2002

(87) PCT Pub. No.: WO01/50707

PCT Pub. Date: Jul. 12, 2001

(51) Int. Cl.
*H04L 12/28* (2006.01)

(52) U.S. Cl. .................. 370/399; 370/389; 370/395.2; 370/409

(58) Field of Classification Search .............. 370/468, 370/230, 431, 392.2, 236, 237, 464, 465, 370/389, 397, 399, 394, 409; 709/226, 230, 709/236, 237
See application file for complete search history.

(56) References Cited

U.S. PATENT DOCUMENTS

| | | | |
|---|---|---|---|
| 6,202,094 B1 * | 3/2001 | Grosser et al. | 709/226 |
| 6,463,475 B1 * | 10/2002 | Calhoun | 709/227 |
| 6,483,870 B1 * | 11/2002 | Locklear et al. | 375/222 |
| 6,549,540 B1 * | 4/2003 | Ward | 370/412 |
| 6,748,543 B1 * | 6/2004 | Vilhuber | 726/8 |
| 6,754,714 B1 * | 6/2004 | Chebrolu | 709/229 |
| 6,862,618 B1 * | 3/2005 | Gray et al. | 709/224 |
| 6,993,611 B2 * | 1/2006 | Ajanovic et al. | 710/107 |
| 7,046,630 B2 * | 5/2006 | Abe et al. | 370/232 |

FOREIGN PATENT DOCUMENTS

| WO | WO98/45993 | 10/1998 |
|---|---|---|
| WO | WO99/66690 | 12/1999 |

OTHER PUBLICATIONS

Conant G E: "Multilink PPP: One Big Virtual Wan Pipe" Data Communications, vol. 24, No. 13, Sep. 21, 1995, pp. 85-88, 90 XP000526197.

Sklower et al. "RFC 1990—The PPP Multilink Protocol (MP)" Request for Comments: 1990, Aug. 1, 1996, pp. 1-24, XP002147194.

* cited by examiner

*Primary Examiner*—Hanh Nguyen
(74) *Attorney, Agent, or Firm*—Brake Hughes Bellermann LLP

(57) ABSTRACT

According to the present invention, a switching method and a switching device (3) are disclosed for providing a multilink connection between a subscriber (1) and a network (2), the multilink connection consisting of a plurality of physical connections taken by the subscriber (1). The switching device (3) comprises a plurality of converting means (34, 35) each converting, upon activation, physical connections into a logical connection to the network (2) and converting a logical connection from the network (2) into physical connections. Furthermore, the switching device (3) comprises control means (31, 32, 33) for accepting a connection from the subscriber (1), for detecting that the connection is a physical connection belonging to a multilink connection, for activating one of the converting means (34, 35) for the detected multilink connection, and for directing the accepted connection and subsequently accepted physical connections belonging to the detected multilink connection to the converting means (34, 35) activated for this multilink connection.

7 Claims, 2 Drawing Sheets

EFFECTIVE MULTILINK FLOW HANDLING

PRIORITY CLAIM

This is a national stage of PCT application No. PCT/EP99/10475, filed on Dec. 30, 1999. Priority is claimed on that application.

FIELD OF THE INVENTION

The present invention relates to a switching method and a switching device for providing a multilink connection between a subscriber and a network, the multilink connection consisting of a plurality of physical connections taken by the subscriber.

In particular, the present invention is related to a device that connects subscribers of a telephone network, for example PSTN (Public Switched Telephone Network), ISDN (Integrated Service Digital Network), GSM (Global System for Mobile Communications) and WCDMA (Wideband Code Division Multiple Access) to Internet.

BACKGROUND OF THE INVENTION

In general, AS (Access Server) devices support multilink connections from subscribers of a telephone network to a packet switched network like the Internet. A multilink represents connections in which a subscriber uses several physical links within one logical connection to the Internet. When forming multilink connections, the major problem is that typically the physical connections between the subscriber and the AS device are terminated in different hardware entities at the AS device.

However, because of packetization of user data to a single logical Internet connection, the several physical connections used for the single logical connection actually have to be terminated at one hardware entity at the AS device. Thus, forming one logical connection consisting of different physical connections can be handled only by using tunneling protocols. For example, in case of multilink connection containing two physical connections, the first physical connection is tunneled from the hardware entity of the AS device at which it is terminated to the hardware entity of the AS device at which the second physical connection is terminated. This tunneling may use either internal transmission paths of the AS device or the Internet itself.

However, the above-described tunneling method raises several problems. The tunneling of user data from one hardware entity of the AS device to another increases the load of these elements. Moreover, using the Internet for tunneling the user data, unmanageable problems may occur because of unpredictable behavior of the Internet.

SUMMARY OF THE INVENTION

Therefore, it is an object of the present invention to provide a device for supporting multilink connection to a network, in which device no tunneling between hardware entities has to be performed.

This object is achieved by a switching device for providing a multilink connection between a subscriber and a network, the multilink connection consisting of a plurality of physical connections taken by the subscriber, comprising:

a plurality of converting means each converting, upon activation, physical connections into a logical connection to the network and converting a logical connection from the network into physical connections; and control means for accepting a connection from the subscriber, for detecting that the connection is a physical connection belonging to a multilink connection, for activating one of the converting means for the detected multilink connection, and for directing the accepted connection and subsequently accepted physical connections belonging to the detected multilink connection to the converting means activated for this multilink connection.

In addition, this object is achieved by a switching method for providing a multilink connection between a subscriber and a network, the multilink connection consisting of a plurality of physical connections taken by the subscriber, comprising the steps of:

accepting a connection from the subscriber;

detecting that the connection is a physical connection belonging to a multilink connection;

activating one of a plurality of converting means for the detected multilink connection, each converting means converting, upon activation, physical connections into a logical connection to the network and converting a logical connection from the network into physical connections; and directing the accepted connection and subsequently accepted physical connections belonging to the detected multilink connection to the converting means activated for this multilink connection.

According to the present invention, the QoS (Quality of Service) of multilink connections can be enhanced due to the fact that tunneling delays are eliminated. Furthermore, the load relating to the control of multilink connections and consumption of resources can be decreased.

In the following, the present invention will be described by way of a preferred embodiment thereof with respect to the accompanying drawings.

DESCRIPTION OF THE PREFERRED EMBODIMENT

Figure 1:
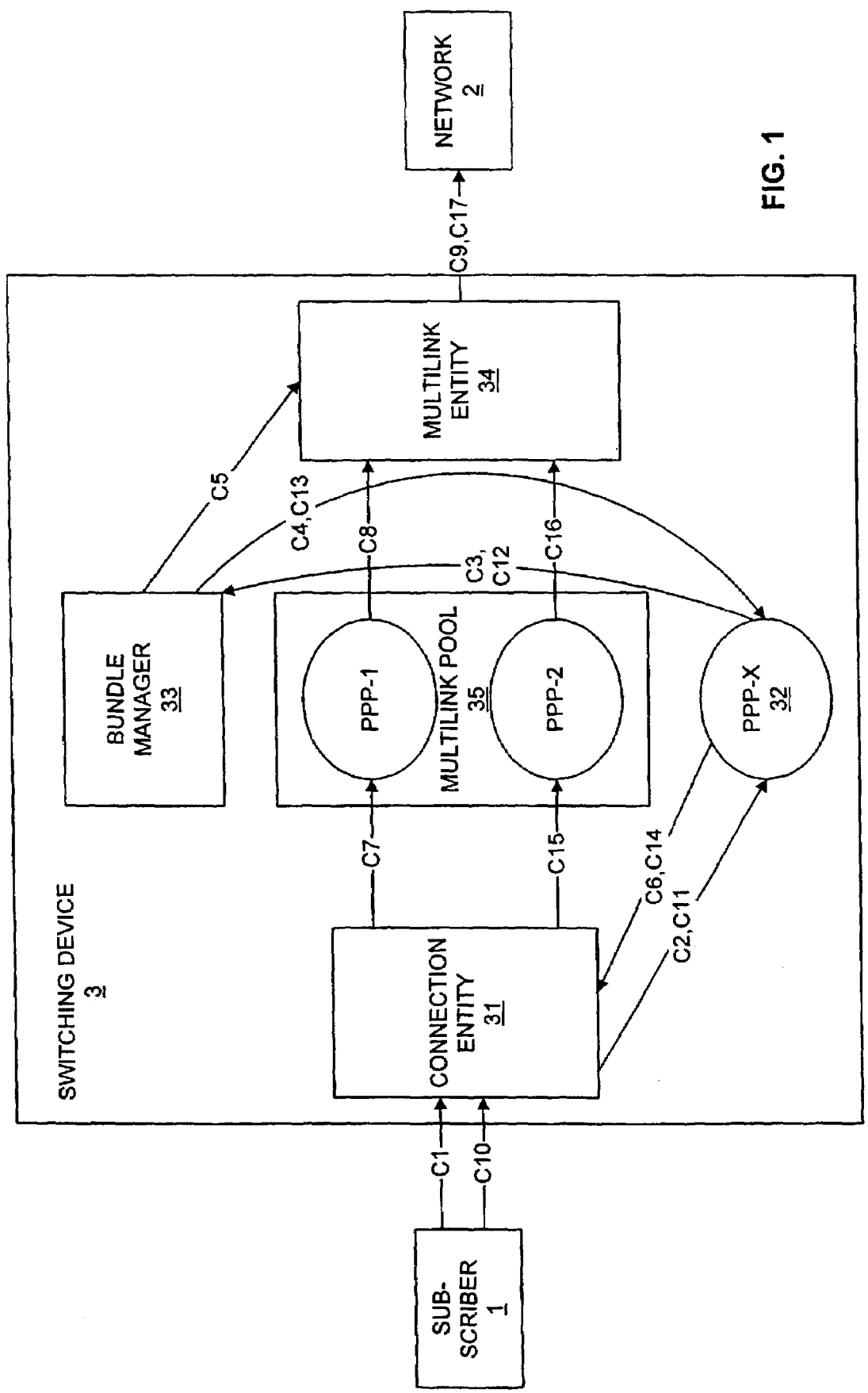
FIG. 1 shows a schematic block diagram illustrating a system and communications performed in the system including a switching device according to a preferred embodiment of the present invention.

FIG. 1 shows a schematic block diagram of a system including a switching device 3 according to the preferred embodiment of the present invention. The features of the switching device 3 may be implemented in an Access Server device (AS device), for example.

In FIG. 1 a subscriber 1 of a telephone network like PSTN, ISDN, GSM and WCDMA connects to a packet-switched network 2 like the Internet via the switching device 3.

The switching device 3 comprises a connection entity 31 which handles connections between the subscriber 1 and the switching device 3 as well as internal connections of the switching device 3. The switching device further comprises a PPP-instance PPP-X 32 representing a free PPP-instance to which the connection entity 31 connects first. PPP means point-to-point protocol which is a method for transmitting datagrams over serial point-to-point links. Thus, a PPP-instance is a node in the switching device 3 which adapts the point-to-point protocol.

As shown in FIG. 1, the switching device 3 also includes a bundle manager 33 which handles multilink connections of the switching device 3. The bundle manager 33 is aware of multilink connections of the system of FIG. 1 and corresponding states. In addition the bundle manager 33 controls a multilink pool 35.

The multilink pool 35 inside the switching device 3 comprises a plurality of PPP-instances PPP-1, PPP-2, . . . , PPP-N which form hardware entities reserved for multilink usage. In FIG. 1, two PPP-instances PPP-1 and PPP-2 are shown for a multilink connection consisting of two physical connections forming one logical connection to the network 2. In particular, PPP-1 and PPP-2 form one hardware entity which connects to a corresponding multilink entity 34.

The multilink entity 34 handles the subscriber's multilink service. The multilink entity 34 gathers the subscriber's physical transmission links of the same hardware entity (PPP-1 and PPP-2 in FIG. 1) to one logical connection to the network 2 and vice versa.

In the following, the communications performed in the system of FIG. 1 will be described.

In case the subscriber 1 takes a first physical connection to the switching device 3 by means of the connection entity 31 (C1), the connection entity 31 forms a connection to a free PPP-instance located inside the switching device 3 (C2). Here, the free instance is called PPP-X. PPP-X is not located in the multilink pool 35. The default is that the connection taken by the subscriber 1 is not multilink type. PPP-X detects that the subscriber asks for multilink service and, hence, informs the bundle manager 33 of the multilink connection request (C3). The bundle manager 33 has information of all multilink connections of the whole system. It is able to find out, for example on the basis of user information (e.g. username of the subscriber), that the subscriber in question has no previous resources reserved, i.e. that the connection request of the subscriber 1 is the first physical connection of a multilink connection to the switching device 3.

After having checked the resources of the subscriber 1, the bundle manager 33 informs the PPP-instance PPP-X to forward the information to the connection entity 31, which information is required for resource reservation from the multilink pool 35 (C4). Because the first physical connection equipped with multilink information of the subscriber 1 is in question, the bundle manager 33 has to start an object, i.e. the corresponding multilink entity 34, which has to handle the bundling of multilink connections (C5).

PPP-X transmits the multilink pool information received from the bundle manager 33 and previously negotiated PPP-parameters to the connection entity 1 (C6). After that the connection entity 31 is able to form a connection to a PPP-instance reserved from the multilink pool 35. In this case, the connection entity 31 forms a connection to PPP-1 and transmits the parameters received from PPP-X to PPP-1 (C7). This allows PPP-1 to start up to the same state as which was state of PPP-X. Now, PPP-1 is ready to transmit traffic to the multilink entity 34 (C8), which traffic is transmitted to the network 2 by the multilink entity 34 (C9), so that traffic between the subscriber 1 and the network 2 can be transmitted.

Next, the subscriber 1 takes another physical connection of the same multilink connection to the switching device 3 through the connection entity 31 (C10). Again, the connection entity 31 forms a connection between the subscriber 1 and a free PPP-instance (PPP-X) of the switching device 3 (C11). Again, multilink requirement is found out.

PPP-X informs the bundle manager 33 of the connection requirement (C12). The bundle manager checks on the basis of information about all multilink connections of the system whether the subscriber 1 has previous resources reserved. The bundle manager 33 is able to find out, on the basis of identification information (e.g. username of the subscriber), that the subscriber 1 in question already has reserved resources, reserved from the multilink pool 35 and from the certain physical hardware entity formed of PPP-1. Thus, the bundle manager 33 reserves a resource for the other physical connection, which resource is located at the same hardware entity as the resource PPP-1 of the first physical connection. After the reservation, the bundle manager 33 informs the PPP-instance PPP-X that the reservation has been performed (C13).

PPP-X transmits the multilink information received from the bundle manager 33 together with parameters negotiated by PPP-X to the connection entity 31 (C14). This enables the connection entity 31 to form a connection to a PPP-instance reserved from the multilink pool 35. According to FIG. 1, the connection entity 31 forms a connection to PPP-2 and transmits the parameters received from PPP-X to PPP-2 (C15) so that PPP-2 starts up to the similar state as PPP-X was.

Thus, PPP-2 located at the same hardware entity as PPP-1 is ready to transmit traffic to the same multilink entity 34 as PPP-1 (C16). The multilink entity 34 transmits the traffic of the second physical connection to the network 2 (C17). Therefore, the multilink entity 34 is able to transmit traffic between the subscriber 1 and the network 2 using a single network address, although two physical connections are used.

As described above, using the multilink pool 35, multilink connections of a plurality of subscribers can be directed to the respectively same hardware entity which in turn is in connection with one corresponding multilink entity 34.

The physical connection amount from the subscriber 1 to the multilink entity is not restricted to two, but in case more physical connections are taken into use, the communication parts C10 to C17 have to be repeated. In the example shown in FIG. 1, the PPP-instances PPP-1 and PPP-2 of the multilink pool 35 are located at the same hardware entity. This is important when terminating connections, which are actually going through different PPP-instances, at a single multilink entity.

Figure 2:
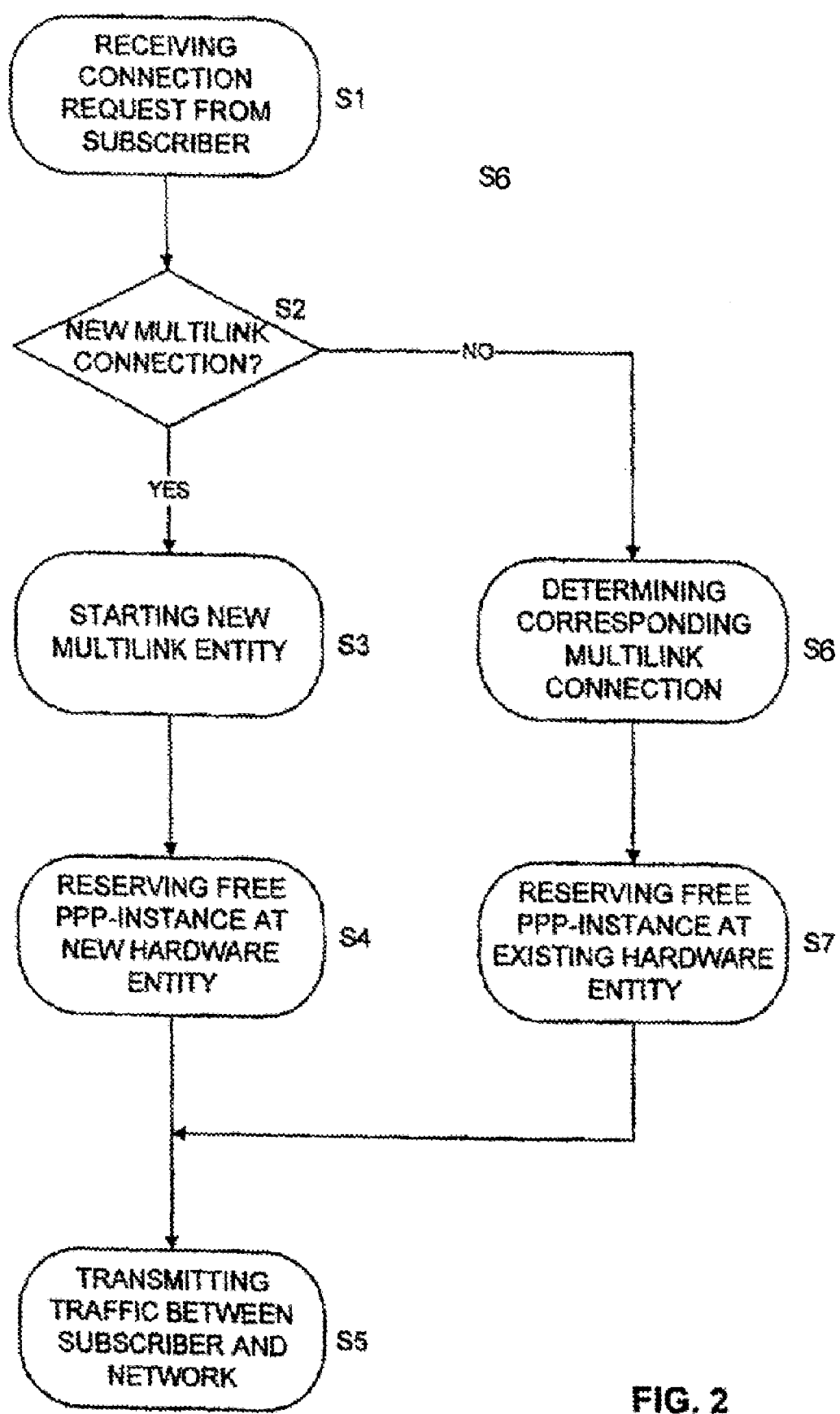
FIG. 2 shows a flow chart illustrating the operation of the switching device of FIG. 1 according to the preferred embodiment of the present invention.

With reference to the flowchart shown in FIG. 2, the operation of the switching device 3 will be described in a more general way.

When the switching device 3 of FIG. 1 receives a (physical) connection request from the subscriber 1 (step S1), it checks whether the requested connection belongs to a multilink connection which is already established between the subscriber 1 and the network 2 by means of the switching device 3.

If it is detected in step S2 that the connection represents a new multilink connection to be established between the subscriber 1 and the network 2, the switching device 3 starts a new or free multilink entity 34 for the new multilink connection (step S3). Then, a new or free PPP-instance (PPP-1 in FIG. 1) is reserved for the requested physical connection at a new hardware entity (step S4). As a result, the connection between the subscriber 1 and the network 2 is established via the hardware entity and the multilink entity for this hardware entity so that traffic can be transmitted between the subscriber 1 and the network 2 (step S5).

In case it is detected in step S2 that the requested connection belongs to an already established multilink connection, this multilink connection is determined (step S6) as described in connection with FIG. 1. Then, a free PPP-instance at the already existing hardware entity for the established multilink connection is reserved (step S7). According to FIG. 1, PPP-2 is reserved for the connection C10 at the same hardware entity to which PPP-1 belongs. As a result, the connection is established between the subscriber 1 and the network 2 via the existing hardware entity and the corresponding multilink entity 34 (step S5) which has been started already for the multilink connection to which the physical connection belongs.

According to the present invention, the use of tunneling protocols for tunneling physical connections from one hardware entity of the switching device to another hardware entity can be avoided.

In view of this fact, the QoS (Quality of Service) of multilink connections can be enhanced and the load relating to the control of multilink connections and consumption of resources can be decreased.

While the invention has been described with reference to a preferred embodiment, the description is illustrative of the invention and is not to be construed as limiting the invention. Various modifications and applications may occur to those skilled in the art without departing from the true spirit and scope of the invention as defined by the appended claims.

What is claimed is:

1. A switching device comprising:
 a plurality of hardware entities, each of said plurality of hardware entities comprising a plurality of connection units;
 a converting unit configured to gather, upon activation, physical connections into a logical connection to the network and vice versa; and
 a control unit configured to:
  accept a connection from a subscriber,
  detect that the connection is a physical connection belonging to a multilink connection between the subscriber and the network,
  reserve, for the detected multilink connection, a first connection unit of the plurality of connection units at a hardware entity selected from the plurality of hardware entities,
  reserve additional connection units belonging to the same hardware entity as the first connection unit for subsequently accepted physical connections belonging to the detected multilink connection, and
  direct the accepted connection and subsequently accepted physical connections belonging to the detected multilink connection to the first and additional connection units of the hardware entity connected to the converting unit activated for this multilink connection.

2. The switching device of claim 1, wherein the control unit is configured to detect that a physical connection belongs to the detected multilink connection based on identification information included in the physical connection.

3. A switching method comprising:
 accepting a connection from a subscriber;
 detecting that the connection is a physical connection belonging to a multilink connection between the subscriber and a network;
 reserving, for the detected multilink connection, a first connection unit of a plurality of connection units at a hardware entity selected from a plurality of hardware entities;
 reserving additional connection units belonging to the same hardware entity as the first connection unit for subsequently accepted physical connections belonging to the detected multilink connection; and
 directing the accepted connection and subsequently accepted physical connections belonging to the detected multilink connection to the first and additional connection units of the hardware entity connected to the converting unit activated for this multilink connection.

4. The switching method of claim 3, wherein whether a physical connection belongs to the certain multilink connection is detected based on identification information included in the physical connection.

5. A switching device for providing a multilink connection between a subscriber and a network, the multilink connection consisting of a plurality of physical connections taken by the subscriber, comprising:
 a plurality of converting units each configured to gather, upon activation, physical connections into a logical connection to the network and gather a logical connection from the network into physical connections, each of said plural converting means comprising a plurality of connection units; and
 a control unit configured to:
  accept a connection from the subscriber,
  detect that the connection is a physical connection belonging to a multilink connection,
  reserve a first connection unit of said plural connection units for the detected multilink connection,
  reserve additional connection units belonging to an identical converting unit as the first connection unit for subsequently accepted physical connections belonging to the detected multilink connection, and
  direct the accepted connection and subsequently accepted physical connections belonging to the detected multilink connection to the first and additional connection units of the converting units activated for this multilink connection.

6. The switching device of claim 5, wherein the control unit is configured to detect that a physical connection belongs to the certain multilink connection based on identification information included in the physical connection.

7. A computer-readable medium encoded with a computer program, the computer program comprising:
 computer code for accepting a connection from a subscriber;
 computer code for detecting that a connection is a physical connection belonging to a multilink connection between the subscriber and a network;
 computer code for reserving, for the detected multilink connection, a first connection unit of a plurality of connection units at a hardware entity selected from a plurality of hardware entities;

computer code for gathering, upon activation, physical connections into a logical connection to the network and vice versa;

computer code for reserving additional connection units belonging to the same hardware entity as the first connection unit for subsequently accepted physical connections belonging to the detected multilink connection; and computer code for directing the accepted connection and subsequently accepted physical connections belonging to the detected multilink connection to the first and additional connection units of the hardware entity connected to the converting unit activated for the multilink connection.

* * * * *